United States Patent
Martini et al.

(10) Patent No.: US 8,454,872 B2
(45) Date of Patent: Jun. 4, 2013

(54) METHOD OF INJECTION MOLDING OPENING DEVICES ON SHEET MATERIAL FOR PACKAGING POURABLE FOOD PRODUCTS

(75) Inventors: Pietro Martini, Parma (IT); Niels Damkjaer, Kävlinge (SE); Masamichi Kaneko, Shibuya-ku (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 642 days.

(21) Appl. No.: 12/663,069

(22) PCT Filed: Jun. 27, 2008

(86) PCT No.: PCT/EP2008/058334
§ 371 (c)(1),
(2), (4) Date: Dec. 4, 2009

(87) PCT Pub. No.: WO2009/000927
PCT Pub. Date: Dec. 31, 2008

(65) Prior Publication Data
US 2010/0166923 A1 Jul. 1, 2010

(30) Foreign Application Priority Data
Jun. 28, 2007 (EP) .................................... 07425401

(51) Int. Cl.
*B29C 45/14* (2006.01)
(52) U.S. Cl.
USPC ............ 264/163; 264/257; 264/266; 264/275
(58) Field of Classification Search
None
See application file for complete search history.

(56) References Cited

U.S. PATENT DOCUMENTS 3,184,096 A * 5/1965 Cheeley .................. 220/260
5,147,591 A * 9/1992 Yoshida ................. 264/163

(Continued)

FOREIGN PATENT DOCUMENTS

EP 1 352 840 A1 10/2003
JP 62-211117 A 9/1987

(Continued)

OTHER PUBLICATIONS

International Search Report of Application No. PCT/EP2008/058334 dated Aug. 21, 2008.

(Continued)

*Primary Examiner* — Edmund H. Lee
(74) *Attorney, Agent, or Firm* — Buchanan Ingersoll & Rooney PC

(57) ABSTRACT

A method of injection molding an opening device on sheet packaging material for packaging pourable food products; the packaging material has at least a first and a second layer, and an opening formed through the first layer and sealed by a cover portion of the second layer; the method includes the steps of injecting molten plastic material onto a first side of the cover portion of the second layer, feeding the molten plastic material along the cover portion to cover it on the first side, and feeding the molten plastic material through an annular peripheral portion of the cover portion to form a spout of the opening device projecting from a second side, opposite the first side, of the cover portion; the molten plastic material covers the cover portion to define, with the cover portion, a user-removable sealing portion of the spout.

17 Claims, 3 Drawing Sheets

U.S. PATENT DOCUMENTS

| | | |
|---|---|---|
| 5,829,672 A | 11/1998 | Mogard et al. |
| 6,303,066 B1 | 10/2001 | Gustafsson et al. |
| 2002/0028270 A1 | 3/2002 | Gustafsson et al. |
| 2005/0284836 A1 | 12/2005 | Majoor et al. |

FOREIGN PATENT DOCUMENTS

| | | | |
|---|---|---|---|
| JP | 7-300151 A | | 11/1995 |
| JP | 07300151 | * | 11/1995 |
| JP | 8-091410 A | | 4/1996 |
| RU | 2005115496 A | | 1/2006 |
| WO | WO 98/18608 A1 | | 5/1998 |
| WO | 2004035410 A1 | | 4/2004 |

OTHER PUBLICATIONS

Written Opinion of the International Searching Authority of Application No. PCT/EP2008/058334 dated Aug. 21, 2008.

Russian Decision to Grant dated Aug. 27, 2012 issued in the corresponding Russian Patent Application No. 2010102786 and English language translation.

* cited by examiner

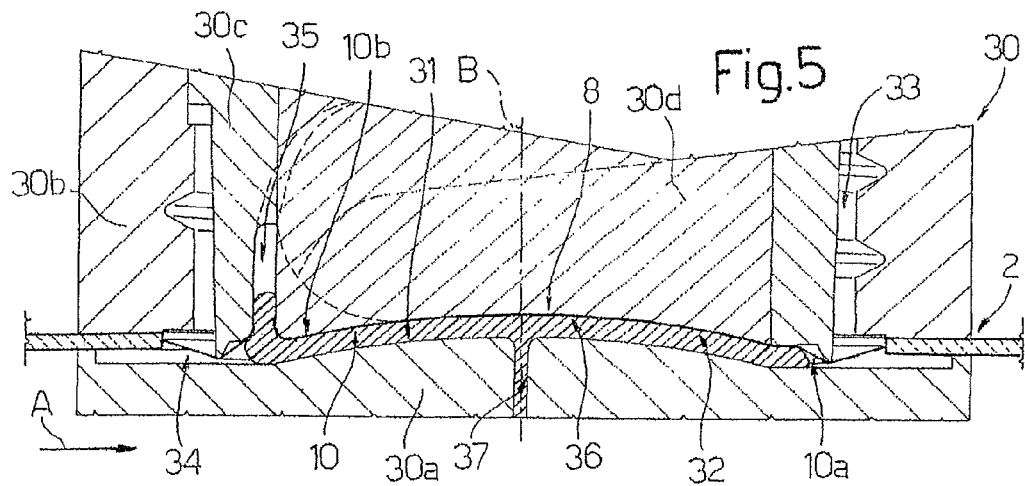
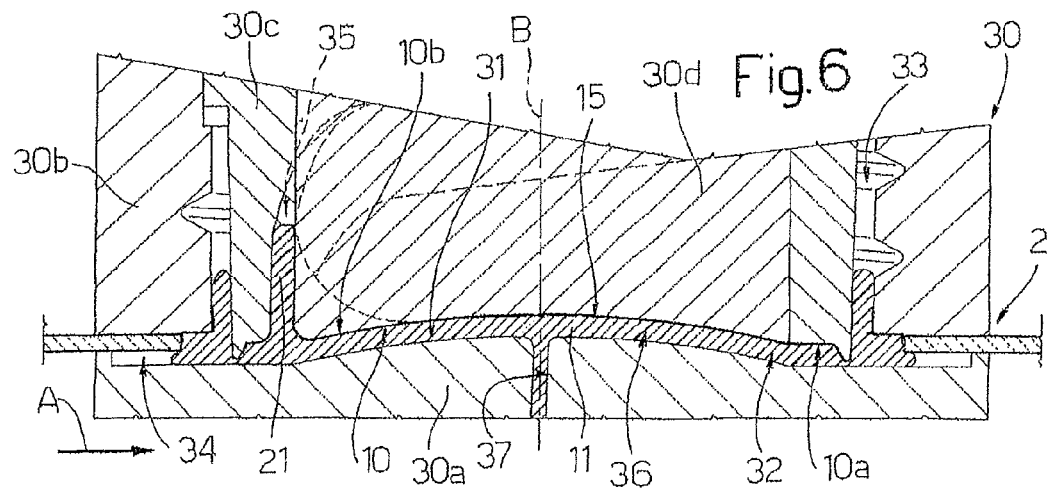
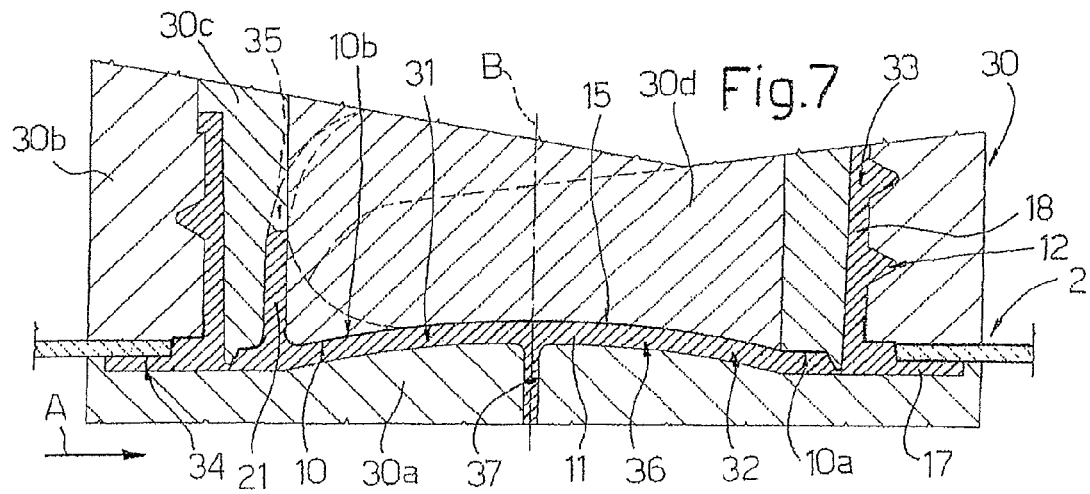

METHOD OF INJECTION MOLDING OPENING DEVICES ON SHEET MATERIAL FOR PACKAGING POURABLE FOOD PRODUCTS

TECHNICAL FIELD

The present invention relates to a method of injection molding opening devices on sheet material for packaging pourable food products, and to the packaging material and package obtained using such a method.

BACKGROUND ART

As is known, many pourable food products, such as fruit juice, UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or mineral-filled polypropylene material; and a number of lamination layers of heat-seal plastic material, e.g. polyethylene films, covering both sides of the base layer.

In the case of aseptic packages for long-storage products, such as UHT milk, the packaging material also comprises a layer of gas-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

Packages of this sort are normally produced on fully automatic packaging machines, on which a continuous tube is formed from the web-fed packaging material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally to form a vertical tube.

The tube is filled with the sterilized or sterile-processed food product, and is sealed and subsequently cut along equally spaced cross sections to form pillow packs, which are then folded mechanically to form respective finished, e.g. substantially parallelepiped-shaped, packages.

Alternatively, the packaging material may be cut into blanks, which are formed into packages on forming spindles, and the packages are filled with the food product and sealed. One example of this type of package is the so-called "gable-top" package known by the trade name Tetra Rex (registered trademark).

To open the packages described above, various solutions have been proposed, including reclosable opening devices made of plastic material and substantially comprising a spout, e.g. tubular, defining a through opening and fitted to a hole in a wall of the package; and a removable, e.g. screw or hinged, cap fitted to and outwardly closing the spout.

When producing the opening device, the opening of the spout is sealed by a plastic membrane connected integrally to the spout and detachable from it along a normally circular tear line; and, on the side facing the cap, the membrane has an integral projecting pull ring, the free end of which is pulled by the user to detach the membrane from the spout along the tear line and so open the product pour opening. More specifically, the pull ring extends inside, and at a predetermined distance from, the spout.

Using the opening devices described, the package is easy to open, with a reasonable amount of twist required of the user, and the membrane is detached neatly from the spout.

The same does not apply, however, in the case of packages requiring not only liquid but also gas sealing where the opening device is fitted to the packaging material.

In such cases, solutions are known in which the membrane of the opening device is fixed directly over a prelaminated hole in the packaging material, i.e. a hole formed in the base layer only and covered by the other lamination layers, including the layer of gas-barrier material.

Using this solution, opening the package calls not only for detaching the membrane from the spout, but also for tearing the layer of barrier material against the edge of the hole through the base layer. With commonly used barrier materials, such as aluminium, this invariably results in a jagged, frayed edge of the hole, thus impairing smooth pour-out of the food product.

DISCLOSURE OF INVENTION

One object of the present invention is to provide an injection molding method by which to apply plastic opening devices cheaply and easily to sheet packaging materials to obtain sealed packages of pourable food products of improved opening and pour characteristics as compared with the aforementioned known packages.

Another object of the present invention is to provide an injection molding method by which to apply plastic opening devices cheaply and easily to sheet packaging materials to obtain sealed packages of pourable food products capable of ensuring effective gas sealing.

At least one of the above objects is achieved by the present invention, which relates to a method of injection molding an opening device on a sheet packaging material for packaging pourable food products, as claimed in claim 1.

The present invention also relates to a sheet material for packaging pourable food products, as claimed in claim 8.

The present invention also relates to a sealed package for packaging pourable food products, as claimed in claim 15 or 16.

BRIEF DESCRIPTION OF THE DRAWINGS

A preferred, non-limiting embodiment of the present invention will be described by way of example with reference to the accompanying drawings, in which:

FIGS. 3 to 7 show sections of the FIG. 2 sheet material at successive steps in injection molding the opening device.

BEST MODE FOR CARRYING OUT THE INVENTION

Figure 1:
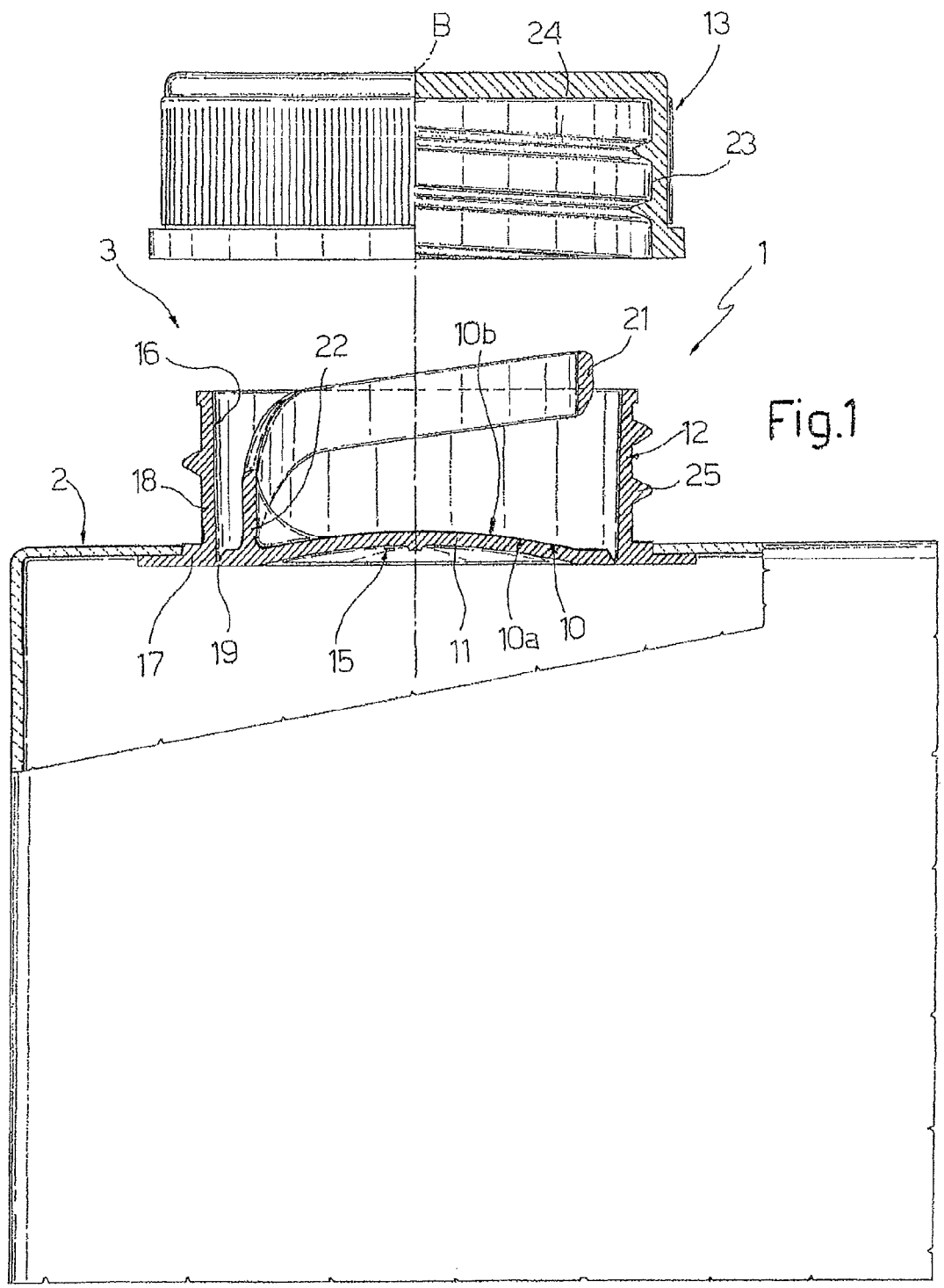
FIG. 1 shows a partly sectioned, exploded side view of a sealed package for pourable food products, made of sheet material on which an opening device is injection molded using the method according to the present invention.

Number 1 in FIG. 1 indicates as a whole a sealed package for pourable food products, made of a multilayer sheet material 2 which is folded and sealed in known manner as described in detail above, and to which an opening device 3 of plastic material is applied using the injection molding method according to the present invention.

In the example shown, package 1 is parallelepiped-shaped and of the type known by the trade name Tetra Brik Aseptic (registered trademark). The method according to the present invention, however, also applies to advantage to other types of packages, such as the gable-top packages known by the trade name Tetra Rex (registered trademark).

Figure 2:
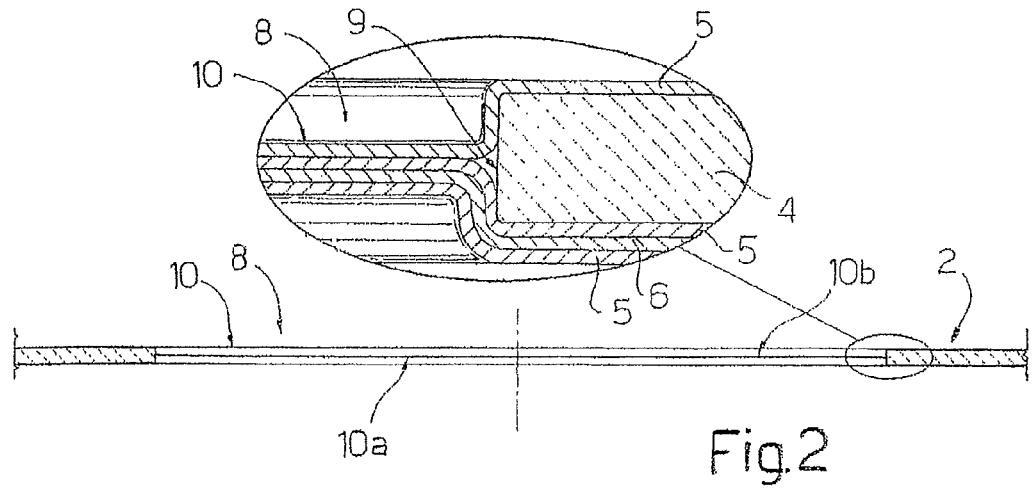
FIG. 2 shows a section of the FIG. 1 sheet material before the opening device is applied.

With particular reference to FIG. 2, material 2 comprises a base layer 4 for stiffness and strength, which may be made of fibrous material, e.g. paper, or mineral-filled polypropylene material; and a number of layers 5 of heat-seal plastic material, e.g.

polyethylene films, covering both sides of base layer 4.

In the case of an aseptic package 1 for long-storage products, such as UHT milk, packaging material 2 also comprises a layer 6 of gas-barrier material, e.g. aluminium foil or ethyl vinyl alcohol (EVOH) film, which is superimposed on a layer 5 of heat-seal plastic material, and is in turn covered with another layer 5 of heat-seal plastic material forming the inner face of package 1 eventually contacting the food product.

In other words, layers 5 and 6 define respective lamination layers applied to base layer 4 when producing material 2 in the form of a continuous strip.

Strip material 2 also comprises a number of removable portions 8 (only one shown in the drawings) equally spaced in a lengthwise direction A of the material, and to which opening devices 3 are subsequently injection molded.

In the following description, reference is made to one removable portion 8 and one opening device 3 for the sake of simplicity.

In the example shown, removable portion 8 is defined by a so-called prelaminated hole, i.e. a hole (or opening) 9 formed through base layer 4 of material 2 and covered by lamination layers 5, 6, so that hole 9 is sealed by a respective sheet cover portion 10.

In an alternative embodiment not shown, cover portion 10 may even be defined by only one or some of layers 5, 6. For example, cover portion 10 may be made solely of gas-barrier material.

In another alternative embodiment not shown, cover portion 10 may be defined by a patch fixed to the rest of material 2 to seal a hole formed, in this case, through the full thickness of material 2.

As shown in particular in FIG. 1, opening device has an axis B perpendicular to the lengthwise direction A of strip material 2, and substantially comprises a membrane attachment portion 11 adhering to one side 10a of cover portion 10—in the example shown, the side eventually facing inwards of package 1; and a cylindrical tubular spout 12, which is fixed to material 2, about hole 9, defines an opening 16 by which to pour the food product from package 1, and extends through cover portion 10 so as to extend on both sides 10a, 10b of the cover portion. Opening device 3 also comprises a cap 13 (FIG. 1) which fits removably to spout 12 to outwardly close opening 16.

More specifically, attachment portion 11 and spout are injection molded in one piece; and cap 13 is formed separately from the whole comprising attachment portion 11 and spout 12.

Attachment portion 11 and cover portion 10 of hole 9 together define a sealing portion 15 sealing opening 16 of spout 12.

As shown particularly in FIG. 1, spout 12 comprises an annular flange portion 17 fixed to material 2, about hole 9; and a cylindrical tubular neck portion projecting axially from an inner lateral edge of flange portion 17, and extending through a peripheral annular portion of cover portion 10. In other words, neck portion 18 projects from material 2 on side 10b opposite the side (10a) to which attachment portion 11 is fixed.

As shown in FIG. 1, attachment portion 11 and flange portion 17 are joined by an annular portion 19, which is smaller in section than portions 11 and 17, so as to tear easily to detach sealing portion 15 from spout 12. In other words, annular portion 19 defines a tear line along which to detach attachment portion 11 from spout 12.

On the side facing cap 13, attachment portion 11 has an integral projecting pull ring 21, by which to detach sealing portion 15 from spout 12 along annular portion 19 and so open opening 16 to pour out the product.

More specifically, pull ring 21 extends inside, and at a predetermined distance from, neck portion 18, and is joined to attachment portion 11 by a tab 22.

As shown in FIG. 1, cap 13 is a screw type, and has a cylindrical lateral wall 23 with an inner thread 24, which engages a corresponding outer thread 25 on neck portion 18 of spout 12.

The method of injection molding opening device 3 on material 2 is as follows.

Strip material 2, in the FIG. 2 configuration, is step-fed in direction A to position a removable portion 8 inside a known molding unit 30 (FIGS. 3 to 7) only illustrated as necessary for a clear understanding of the method according to the present invention.

With reference to FIGS. 3 to 7, molding unit 30 comprises a number of molds 30a, 30b, 30c, 30d, which are coaxial with axis B of the opening device 3 being formed, are located on both sides of material 2, and are movable between an open configuration (not shown) allowing feed of material 2 in direction A, and a closed configuration (FIGS. 3 to 7), in which they define a closed mold cavity 31 which is filled with molten plastic material to define, when the material sets, the whole comprising attachment portion 11 and spout 12.

In the example shown, molds 30b, 30c, 30d are located on the opposite side of material 2 to mold 30a; and, as shown in FIGS. 3 to 7, mold 30c is interposed radially between molds 30b and 30d.

Mold cavity 31 comprises a substantially disk-shaped first portion 32 of axis B; a cylindrical tubular second portion 33 extending, coaxially with axis B, from one side of a flat peripheral annular portion 34 of portion 32; and a third portion 35 which defines pull ring 21 of attachment portion 11, and extends from the same side as portion 33, and from a radially inner point of portion 32 with respect to peripheral annular portion 34.

Portion 32 comprises a convex central portion 36 curving towards portions 33 and 35, and which is connected to peripheral annular portion 34, and is connected, at axis B, to a molten plastic injection conduit 37.

In the FIG. 3-7 example, portion 32 is defined by mold 30a on one side, and by molds 30b, 30c, 30d on the opposite side; portion 33 is defined by molds 30c and 30b; portion 35 is defined by molds 30c and 30d; and conduit 37 extends through mold 30a.

As explained in detail below, portion 32 defines attachment portion 11 and flange portion 17 of spout 12, and portion 33 defines neck portion 18 of spout 12.

Figure 3:
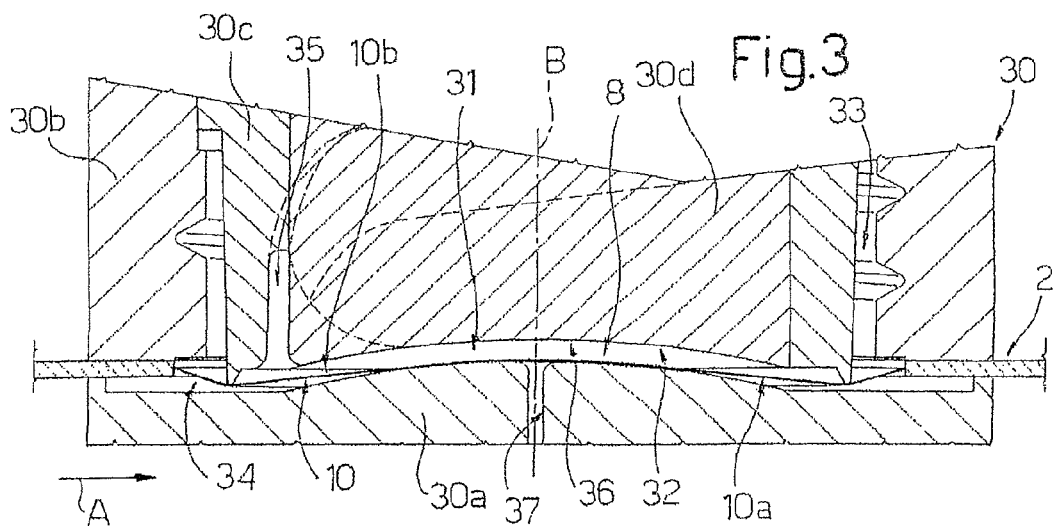
Figure 4:
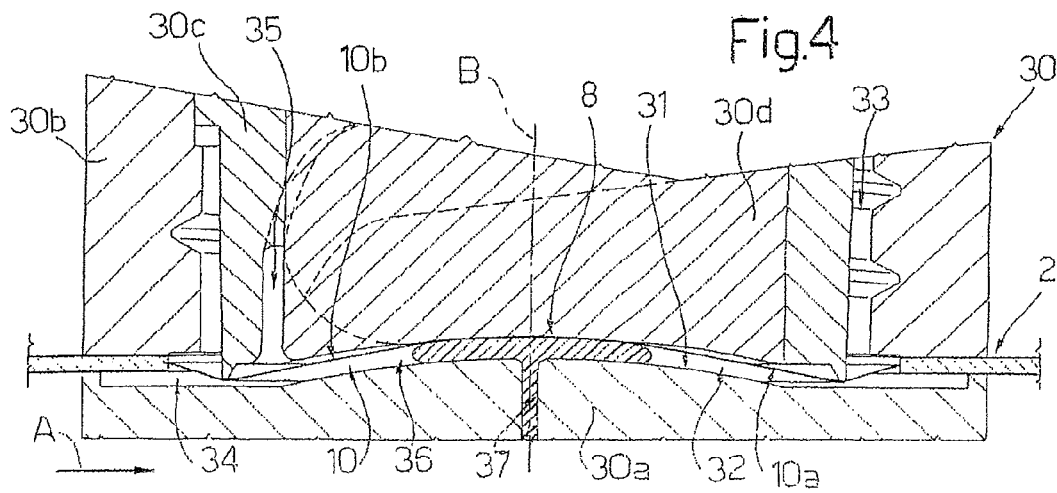

To mold opening device 3, material 2 is stopped inside molding unit 30 in the FIG. 3 configuration, in which cover portion 10 is housed completely, and totally undamaged, inside disk-shaped portion 32 of mold cavity 31. More specifically, cover portion 10 is positioned with side 10b facing portions 33 and 35 of mold cavity 31.

At this point, from side 10a of cover portion 10, molten plastic material is injected along conduit 37 into portion 32 of mold cavity 31, which is gradually filled from central portion 36 towards peripheral annular portion 34.

The pressure of the molten plastic material injected into portion 32 of mold cavity 31 pushes cover portion 10 of material 2 against mold 30d, so that side 10b of cover portion 10 contacts mold 30d.

At this stage, layer 5 of heat-seal plastic material of cover portion 10, facing mold 30a, melts completely with the plastic material injected into mold cavity 31.

The molten plastic material spreads radially inside portion 32 until it eventually reaches the intersection of portions 32 and 35, where cover portion 10, having no solid support by molds 30d and 30c, is pierced neatly by the pressure of the molten plastic material, which therefore fills the whole of portion 35 to form pull ring 21.

In exactly the same way, when the molten plastic material reaches the annular portion at the intersection of portions 32 and 33, cover portion 10 is pierced neatly by the pressure of the molten plastic material, which therefore flows into portion 33 to form neck portion 18 of spout 12 and thread 25.

In other words, the molten plastic material pierces through cover portion 10 at the intersections between portion 32 and portions 33 and 35 of mold cavity 31 to form through openings, which are subsequently sealed off by the plastic material to fully restore the integrity of material 2.

As specifically shown in FIGS. 6 and 7, because of the particular shape of the annular zone at the intersection of portions 32 and 33, and the high speed of the molten plastic material at that portion, cover portion 10 is removed completely from said portion and forms no connecting bridge with spout 12.

Once the plastic material filling the whole of mold cavity 31 sets, molds 30a, 30b, 30c, 30d are moved into the open configuration to feed material 2 once more in direction A, extract the removable portion 8, with respective opening device 3 formed on it, from molding unit 30, and insert another removable portion 8, on which to perform another molding operation, inside cavity 31.

The advantages of the method according to the present invention, and of the resulting packaging material, will be clear from the foregoing description.

In particular, the method described provides for obtaining an opening device 3 firmly connected to cover portion 10 of packaging material 2, but in which the cover portion is first pierced through and then resealed by the plastic material forming spout 12 and pull ring 21. As a result, package 1 has the necessary gas-sealing properties, while at the same time being as easy to open as packages with no gas barrier. That is, to unseal the package produced using the method according to the present invention, the user simply has to tear the annular portion 19 connecting the plastic parts, as opposed to the gas-barrier material, which has already been pierced through when injection molding opening device 3. More specifically, as shown in FIGS. 6 and 7, the gas-barrier material is removed completely from portion 19, and forms no connecting bridge with spout 12.

Moreover, cover portion 10 is pierced neatly, with no fraying, by the high pressure of the plastic material, thus greatly improving smooth pour-out of the food product.

Clearly, changes may be made to the method and resulting packaging material as described herein without, however, departing from the scope as defined in the accompanying Claims.

In particular, the method described may also be performed directly on blanks of packaging material, after they are formed into open containers on spindles, and before they are filled with the pourable food product and sealed.

The invention claimed is:

1. A method of injection molding an opening device on sheet packaging material for packaging pourable food products; said packaging material comprising at least a first layer of fibrous material and a second layer, and having an opening formed through said first layer of fibrous material and sealed by a cover portion of said second layer; and said method comprising:

injecting molten plastic material onto a first side of said cover portion of said second layer that seals the opening in the first layer of fibrous material;

feeding said molten plastic material along said cover portion to cover said cover portion on said first side; and feeding said molten plastic material through an annular peripheral portion of said cover portion to form a spout of said opening device projecting from a second side, opposite said first side, of said cover portion; said molten plastic material covering said cover portion defining, with the cover portion, a user-removable sealing portion of said spout.

2. A method as claimed in claim 1, wherein said second layer comprises gas-barrier material.

3. A method as claimed in claim 2, wherein said packaging material comprises a third layer of heat-seal plastic material applied to said second layer on the injection side; said third layer melting with said molten plastic material flowing along said cover portion.

4. A method as claimed in claim 1, and comprising feeding said molten plastic material through a further portion of said cover portion to define user pull means of said sealing portion, by which to remove the sealing portion from said spout.

5. A method as claimed in claim 1, wherein the molten plastic material, as it flows through, seals the through portion/s of said cover portion.

6. A method as claimed in claim 1, wherein the molten plastic material forms a thread of said spout, which engages a corresponding thread of a screw cap.

7. A method as claimed in claim 1, wherein the molten plastic material flows into the portion immediately adjacent to said peripheral portion of said cover portion through a small-section portion to form a tearable connection between said spout and said sealing portion.

8. A method as claimed in claim 2, and comprising feeding said molten plastic material through a further portion of said cover portion to define user pull means of said sealing portion, by which to remove the sealing portion from said spout.

9. A method as claimed in claim 3, wherein the molten plastic material, as it flows through, seals the through portion/s of said cover portion.

10. A method of injection molding an opening device on sheet packaging material for packaging pourable food products; said packaging material comprising at least a first and a second layer, and having an opening formed through said first layer and sealed by a cover portion of said second layer; and said method comprising:

injecting molten plastic material onto a first side of said cover portion of said second layer;

feeding said molten plastic material along said cover portion to cover said cover portion on said first side; and feeding said molten plastic material through an annular peripheral portion of said cover portion to form a spout of said opening device projecting from a second side, opposite said first side, of said cover portion, the spout of the opening device formed by the feeding of the molten plastic including a flange portion, a tubular neck portion upstanding from the flange portion and through which the pourable food product is poured, and a pull ring positioned inside the tubular neck portion; said molten plastic material covering said cover portion defining, with the cover portion, a user-removable sealing portion of said spout.

11. A method as claimed in claim 10, wherein the cover portion comprises gas-barrier material.

12. A method as claimed in claim 11, wherein the packaging material comprises a third layer of heat-seal plastic material applied to the gas-barrier material, the third layer melting with the molten plastic material flowing along the first side of the cover portion.

13. A method as claimed in claim 10, further comprising piercing the cover portion, at a location radially inwardly of the annular peripheral portion of the cover portion through which the molten plastic material is fed to form the spout, by pressure of the molten plastic material to define a user-operated pull ring positioned radially inwardly of the spout.

14. A method of injection molding an opening device on sheet packaging material for packaging pourable food products; said packaging material comprising at least a first and a second layer, and an opening passing through the first layer, with a portion of the second layer extending across the opening and forming a cover portion that covers and seals the opening, the method comprising:

injecting molten plastic material onto a first side of the cover portion;

feeding the molten plastic material along the first side of the cover portion to cover the first side of the cover portion; and piercing the cover portion, along an annular region of the cover portion adjacent an inner periphery of the opening, by pressure of the molten plastic material which flows away from the first side and forms an annular upstanding spout of the opening device that projects away from the first side of the cover portion, a part of the molten plastic material covering the cover portion, and defining with the cover portion, a user-removable sealing portion of the spout, with the cover portion being unconnected to the upstanding spout.

15. A method as claimed in claim 14, wherein the cover portion comprises gas-barrier material.

16. A method as claimed in claim 15, wherein the packaging material comprises a third layer of heat-seal plastic material applied to the gas-barrier material, the third layer melting with the molten plastic material flowing along the first side of the cover portion.

17. A method as claimed in claim 14, further comprising piercing the cover portion, at a location radially inwardly of the annular region of the cover portion, by pressure of the molten plastic material to define a user-operated pull ring positioned radially inwardly of the spout.

* * * * *